No. 610,153. Patented Aug. 30, 1898.
F. A. BROWNELL.
PHOTOGRAPHIC CAMERA.
(Application filed Aug. 23, 1897.)

(No Model.) 3 Sheets—Sheet 1.

Witnesses.
G. Willard Rich.
Grace A. Roda

Inventor.
Frank A. Brownell
by Frederic F. Church
his Attorney

No. 610,153. Patented Aug. 30, 1898.
F. A. BROWNELL.
PHOTOGRAPHIC CAMERA.
(Application filed Aug. 23, 1897.)
(No Model.) 3 Sheets—Sheet 2.
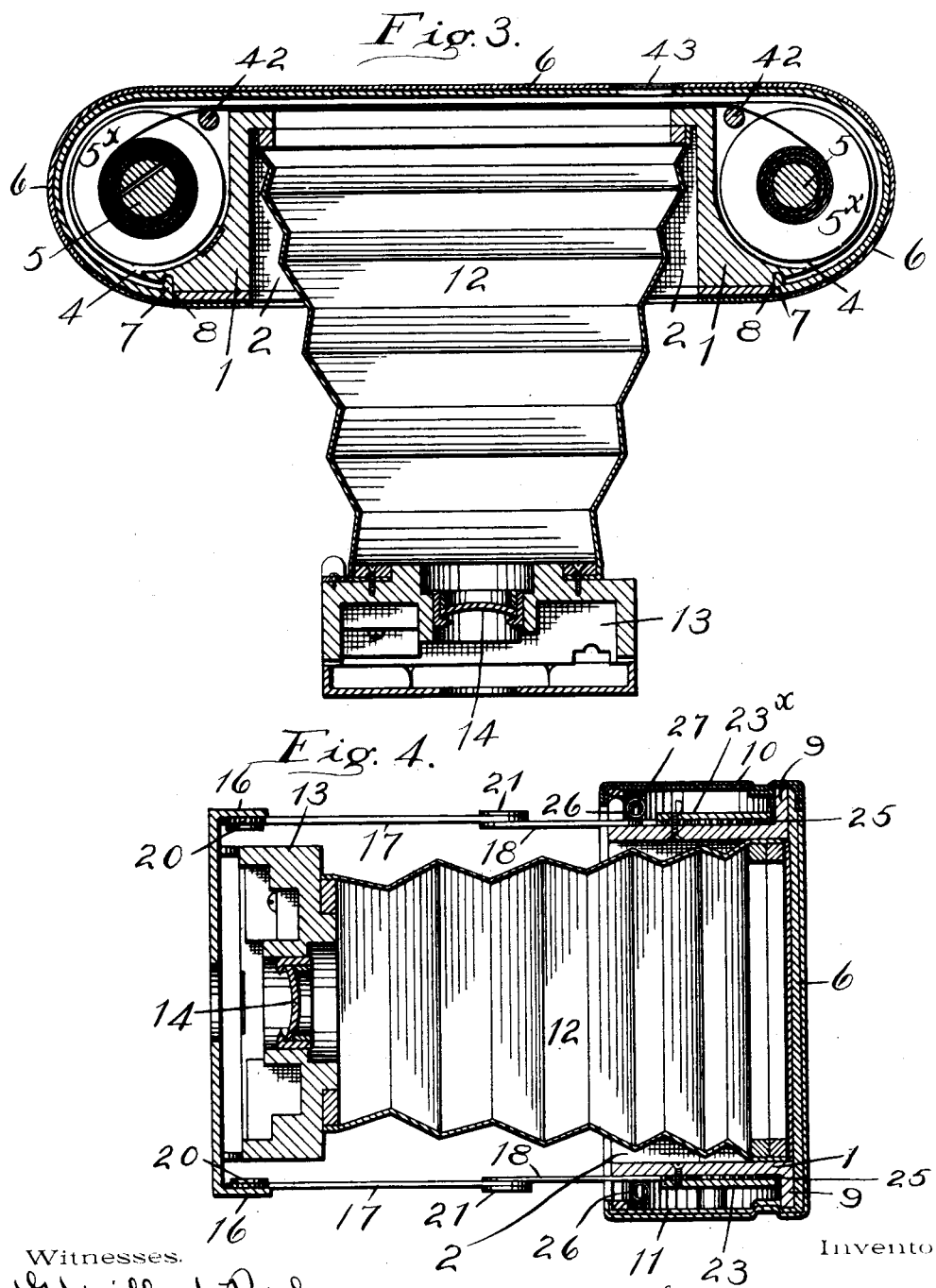

No. 610,153. Patented Aug. 30, 1898.
F. A. BROWNELL.
PHOTOGRAPHIC CAMERA.
(Application filed Aug. 23, 1897.)
(No Model.) 3 Sheets—Sheet 3.
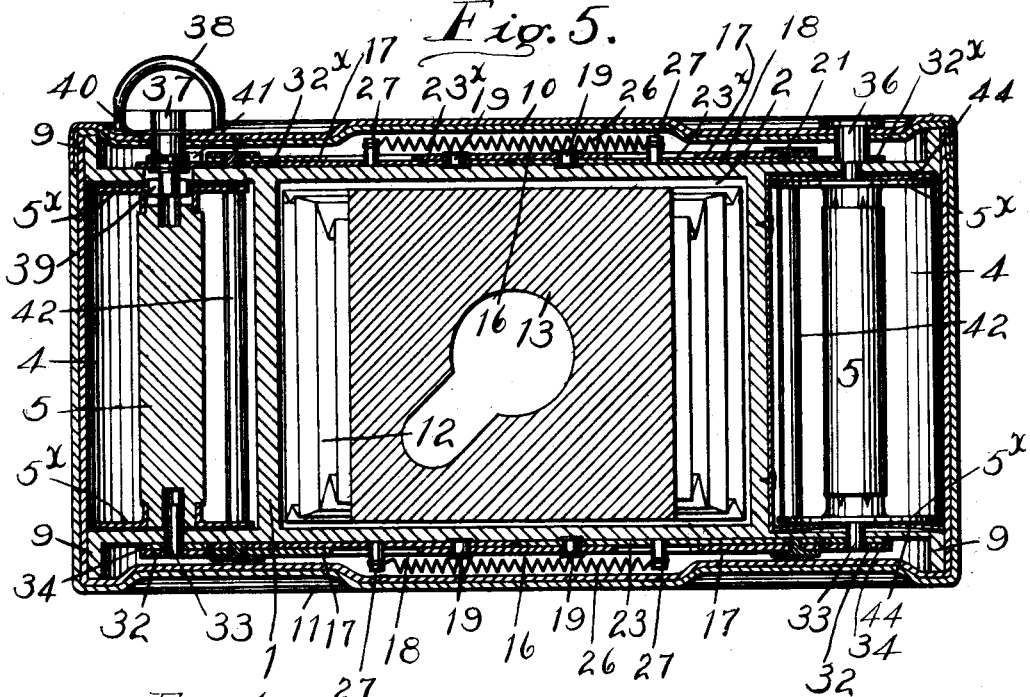
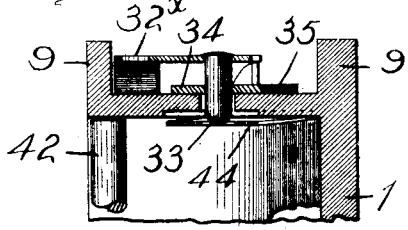
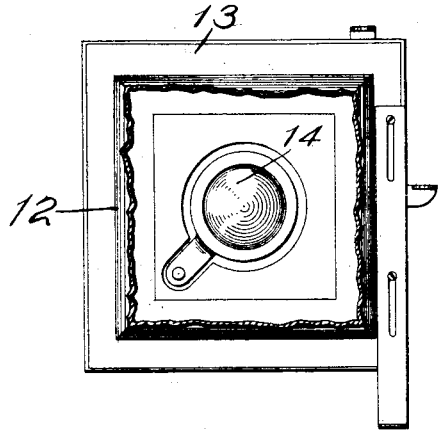
Witnesses.
G. Willard Rich.
Grace A. Roda.
Inventor.
Frank A. Brownell
Frederick F. Church
his Attorney.

UNITED STATES PATENT OFFICE.

FRANK A. BROWNELL, OF ROCHESTER, NEW YORK.

PHOTOGRAPHIC CAMERA.

SPECIFICATION forming part of Letters Patent No. 610,153, dated August 30, 1898.

Application filed August 23, 1897. Serial No. 649,159. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention has for its object to provide a photographic camera particularly adapted for holding film in spools or rolls which is simple in construction and capable of being collapsed or folded into small compass for carrying and of being extended when used, thereby enabling a lens of comparatively long focus to be employed, giving depth to the picture; and to these and other ends it consists in certain improvements in construction and combinations of parts, all as will be hereinafter described, and the novel features pointed out in the claims at the end of this specification.

Figure 1:
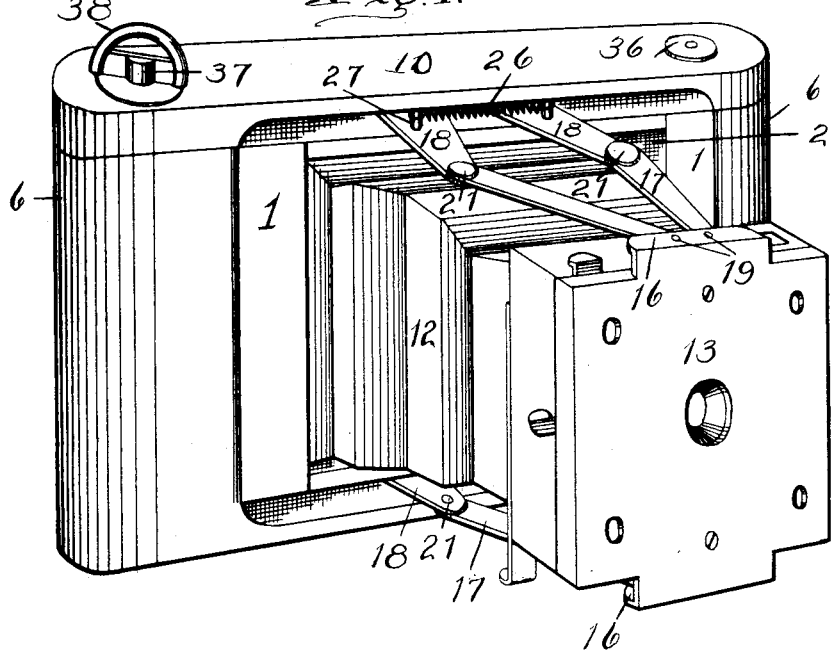
Figure 2:
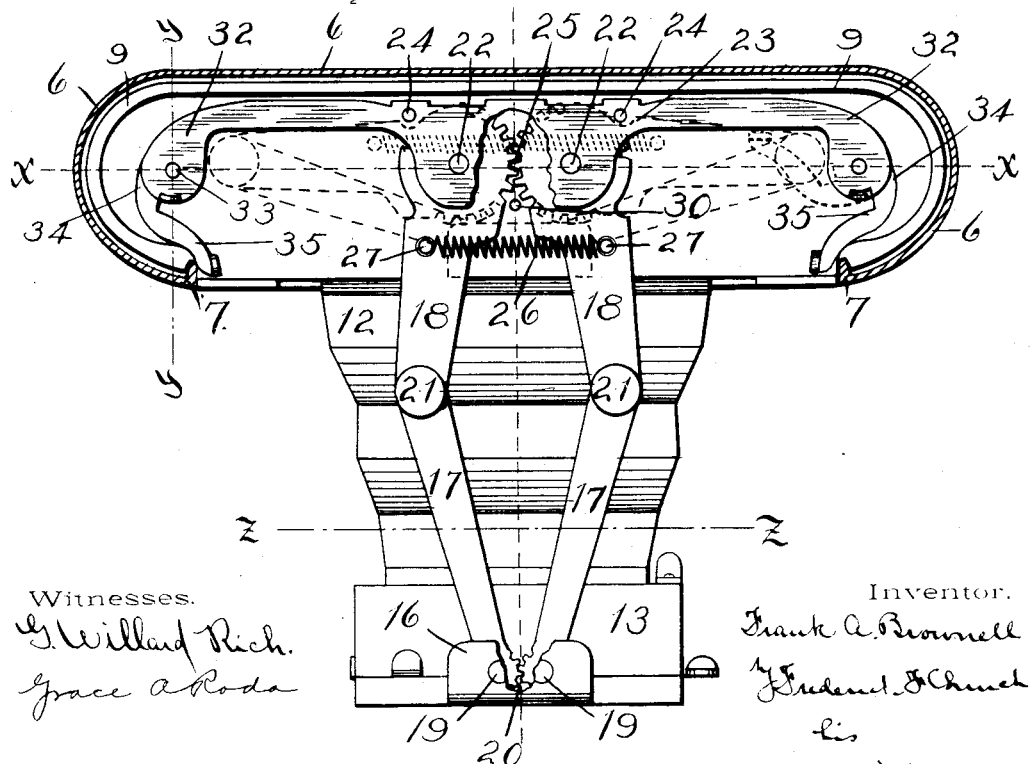

In the drawings, Figure 1 is a perspective view of a camera constructed in accordance with my invention; Fig. 2, a bottom plan view of the same, with a portion of the casing broken away; Fig. 3, a horizontal sectional view; Fig. 4, a vertical sectional view; Fig. 5, a section on the line $x\,x$ of Fig. 2, with the camera folded or collapsed; Fig. 6, a section on the line $y\,y$ of Fig. 2; Fig. 7, a section on the line $z\,z$ of Fig. 2.

Similar reference-numerals in the several figures indicate similar parts.

The main frame of the camera (indicated by 1) is provided with a central recess or chamber 2, adapted to receive the bellows and the camera-front or lens-holder 3, and upon opposite sides thereof are arranged film-chambers 4 for holding the film rolls or spools 5. The rear of the frame and the sides of the film-chambers are open, but adapted to be covered when the camera is in use by a sliding cover or casing 6, preferably constructed of sheet metal, having the rounded ends and the flanges 7, operating in grooves 8 formed in the forward edges of the frame 1, as in Fig. 3. The frame 1 is provided with flanges 9 at top and bottom, and a cover-plate 10, preferably of metal, is secured to the top, forming a recess for containing some of the operating parts, and the corresponding space at the lower end is covered by the bottom plate 11 of the casing. The rear of the central chamber 2 of the frame 1 is open, forming an exposing-aperture, across which the film extends when passing from one film-chamber to the other, and to the edges of this opening is secured the rear end of the bellows 12, the forward end being attached to the camera-front, embodying a board or frame 13, in which the lens 14 and a suitable shutter (not shown) are mounted, said board being connected to a plate 15, provided with the flanges 16 at top and bottom, arranged when the camera is folded to enter the recesses between the plates 10 and 11 and the frame. The camera-front is supported upon arms 17 and 18, one pair of each being arranged at top and bottom, the front ends of arms 17 being pivoted at 19 to the plate 16 and having the intermeshing gear-teeth 20 for causing their simultaneous rotation on their pivots in opposite directions, while their rear ends are pivoted by studs 21 to the forward ends of the arms 18. The rear ends of the arms 18 are pivoted on studs 22 on plates 23 23$^\times$, which extend over them and are secured to the frame 1 by screws 24 or otherwise, said rear ends being provided with intermeshing gear-teeth 25 for causing the equal and simultaneous movement of the arms in opposite directions.

26 indicates springs attached to pins 27 on the arms, connecting the pairs of arms 18 on one side of their pivotal points, the tension of said springs projecting the arms and the camera-front when the pins 27 are forward of the pivotal centers to the position shown in full lines in Fig. 2, and when the front is moved in, said pins 27 being back of the centers 22, the springs will hold the front retracted, as in dotted lines in Fig. 2. The geared connection between the pairs of arms will cause the substantially parallel and positive movements of the front toward and from the frame and will hold the parts either folded or extended. The downwardly-extending lugs or projections 30 of the plates 23 23$^\times$, arranged between the arms 18, (see Fig. 2,) serve as stops to limit the approach of said arms and the amount of the projection of the camera-front or lens-board.

The plates 23 23× are preferably made of spring metal, and their ends are extended over the ends of the film or spool chambers, constituting spring-arms 32 32×, to which the spool holding or centering projections are connected, the lower arms 32× having the studs 33 thereon, arranged to enter recesses in the ends of the spools 5, as in Fig. 5, said projections being retracted by rotary cam-plates 34, journaled on the studs beneath the springs and having operating-arms 35 and projections 36, the latter entering recesses in the springs when the spools are held; but when they are to be released the plate is moved around, as in dotted lines, Fig. 4, raising the stud out of the spool end. (See Fig. 6.)

One of the spring extensions 32× of the upper plate 23× has a centering-stud 36, provided with a head or button accessible from the exterior, which enters the aperture in the supply-spool, while upon the other arm 32× is mounted a winding-arbor 37, having an exterior handle 38, an angular stud 39 to fit within a spool-center to operate it, and a ratchet-wheel 40, with which coöperates a spring-pawl 41, preventing backward rotation of the spool and holding the film.

Small rollers 42 are arranged at the inner edges of the film-chambers, over which the film passes from one spool to the other, the portion of the film in line with the exposing-aperture receiving the image through the lens-aperture, as usual. The film-rolls adapted for use in this camera are of the usual "cartridge" type, embodying the spools 5, having the flanges 5× at opposite ends, and the flexible film, which is covered with black paper at the back, as usual, is wound across from the full to the empty spool.

The markings on the back of the covering-paper or the film itself to determine the various exposures are visible through a small aperture in the back of the casing, covered by a piece 43 of ruby glass, as shown in Fig. 3, and in order that the film may be kept under slight tension across the exposing-aperture in the camera the chamber containing the supply-spool is provided with a small friction-spring 44, secured at its middle to the frame and having its free ends bearing on the flanges of the spool, as shown in Fig. 5.

When the camera is in use, it is extended, as in Fig. 1, the springs on the arms 18 holding the parts steady, and then the film may be wound forward from one spool to the other across the exposing-aperture and the necessary exposures made by any suitable shutter on the camera-front. When desired to remove or change the spools, the casing may be slid off, the curved ends of the latter and the flanges forming suitable ways or guides, and the whole interior of the camera is visible, and the spools may be removed and inserted by manipulating the spring-pressed centering projections, as will be understood.

When the camera is folded for carrying, it is only necessary to push the front inward, the bellows folding in the central chamber of the frame, and the board 13 also, the plate 15 remaining substantially flush with the front of the frame, forming a smooth exterior, the device as a whole being very simple, light, and easily operated. The rounded ends of the frame and the employment of the sheet-metal cover or casing saves space because conforming substantially to the curve of the spools, and the whole forms a flat package easily carried in the pocket.

In order that the front of the camera may be supported and the instrument prevented from tipping forward when it is resting upon a table, as for a time exposure, I provide on the rear side of the front 13 an extensible leg or plate 50, sliding on screws 51 or otherwise guided and adapted when not in use to be moved to the position in full lines in Fig. 7. The friction of the spring metal of which the leg is composed is sufficient to hold the latter in extended position.

I claim as my invention—

1. In a photographic camera, the combination with the frame having the central chamber open at front and back, and the open spool-chambers at the ends on opposite sides of the central chamber, of the bellows connected to the frame at the back of the central chamber, the movable camera-front adapted to fold within the central chamber having the smooth outer face arranged to extend flush with the front of the casing, said front being connected to the bellows, the arms pivoted to the frame and to the front and entirely supporting the latter, and the casing sliding on the frame longitudinally of the spool-chambers covering the back of the central chamber and having the ends extending around the spool-chambers, substantially as described.

2. In a camera, the combination with the frame having the central chamber, the film-chambers on opposite sides thereof, and the grooves 8 in the front portion, of the movable camera-front, the bellows connected thereto and to the rear of the central chamber, the metal casing sliding on the frame longitudinally of the spool-chambers, and covering the back of the central chamber and the spool-chambers and having the flanges 7 coöperating with the grooves 8 in the frame.

3. In a camera, the combination with the frame having the central chamber and the film-chambers on opposite sides thereof, of the bellows connected to the rear of the central chamber, the movable camera-front connected to the bellows and having the smooth front surface and adapted to fold within said central chamber with its outer face flush with the outer surface of the frame, the supporting-arms pivoted to the camera-front and frame and arranged outside of the bellows, and a casing covering the rear and ends of the frame and also the arms when the latter are folded.

4. In a camera, the combination with the main frame and the camera-front, of the two pairs of arms pivoted on the frame, the arms of each pair being connected at their rear ends for simultaneous operation in opposite directions, the two pairs of arms pivoted on the front, the arms of each pair being connected for simultaneous operation in opposite directions, and pivotal connections between the free ends of corresponding arms on the frame and front respectively, substantially as described.

5. In a camera, the combination with the main frame and the camera-front, of the two pairs of arms pivoted on the frame, the arms of each pair being connected for simultaneous operation in opposite directions, two pairs of arms pivoted on the front, the arms of each pair being connected for simultaneous operation in opposite directions, pivotal connections between the arms of corresponding pairs on the frame and front respectively and holding-springs operating across the pivotal centers of the pairs of arms for holding the front projected and retracted, substantially as described.

6. In a camera, the combination with the frame, and the movable front, of the arms 18 pivoted on the frame and having the intermeshing gear-teeth, the arms 17 pivoted on the front having the intermeshing gear-teeth, pivotal connections between the free ends of corresponding pairs of arms, and spring devices operating on the arms for holding the front projected and retracted, substantially as described.

7. In a camera, the combination with the frame having the central chamber, and the film-chambers on opposite sides, of the camera-front, the bellows connected thereto and to the rear edge of the central chamber and adapted to fold in the latter, the pivoted arms connecting the front and frame connected to the outer side of the top and bottom of the frame, the cover-plate 10, and the removable casing sliding on the frame and adapted to cover the bottom thereof and also the central and film chambers, substantially as described.

8. In a camera, the combination with the frame having the central chamber, the film-chambers at opposite sides, and spool-centering devices in the film-chambers, of the movable camera-front, pivoted arms connecting the front and frame for causing the parallel relative movements of the latter, spring devices for holding the front projected or retracted, the bellows connecting the front and frame, the cover-plate 10, and the casing sliding on the frame and covering the rear of the central chamber, the film-chamber and one end of the frame, substantially as described.

9. In a camera, the combination with the frame having the central chamber and the film-chambers on opposite sides thereof, of the movable camera-front, the bellows connected thereto and to the rear of the central chamber, said bellows folding within the central chamber and the front movable flush with the front of the frame, pivoted supporting-arms connecting the front and frame, and the removable casing having the flanges at the sides engaging the frame and adapted to cover the rear and ends of the frame, substantially as described.

10. In a camera, the combination with the frame having the central chamber and the film-chambers on opposite sides thereof, of the movable front and the bellows connected thereto, the plates 23 and $23^\times$ on the frame, having the spring-arms and spool-centering devices on the arms entering the ends of the film-chambers, substantially as described.

11. In a camera, the combination with the frame having the central chamber and the film-chambers on opposite sides thereof, of the movable front and the bellows connected thereto, the plates 23 and $23^\times$ having the spring-arms, spool-centering devices on said arms entering the film-chambers, the arms 18 pivoted on the plates 23 and $23^\times$, the arms 17 pivoted on the camera-front, and pivotal connections between the arms 17 and 18, substantially as described.

12. In a camera, the combination with the frame, having the central chamber and the film-chambers on opposite sides thereof, of the plate $23^\times$ having the spring-arms, the spool-centering stud on one arm, the rotary arbor on the other arm adapted to engage a spool and having the ratchet-wheel and the pawl coöperating therewith, substantially as described.

13. In a camera, the combination with the frame, the movable front, the plates 23, $23^\times$ having the spring-arms and spool-centers thereon, the arms 18 pivoted on the plates and having intermeshing gear-teeth, the arms 17 pivoted on the front having the intermeshing gear-teeth and connected to the arms 18, and the bellows, substantially as described.

14. In a folding camera, the combination with the main frame, having a central chamber, of a movable front smaller than the camera-frame and adapted to fold in the central chamber, foldable supporting-arms connecting the front and frame, and an extensible supporting-leg mounted on the front and adapted to be projected to support the front when extended, substantially as described.

FRANK A. BROWNELL.

Witnesses:
C. E. OWENS,
GEO. BAXTER.